(12) United States Patent
Prakah-Asante et al.

(10) Patent No.: US 8,688,321 B2
(45) Date of Patent: Apr. 1, 2014

(54) TRAFFIC DENSITY ESTIMATION

(75) Inventors: Kwaku O. Prakah-Asante, Commerce Township, MI (US); Fling Tseng, Ann Arbor, MI (US); Dimitar Petrov Filev, Novi, MI (US); Jianbo Lu, Livonia, MI (US); Ryan Abraham McGee, Ann Arbor, MI (US); Jeffrey Allen Greenberg, Ann Arbor, MI (US); Gary Steven Strumolo, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 206 days.

(21) Appl. No.: 13/179,664

(22) Filed: Jul. 11, 2011

(65) Prior Publication Data
US 2013/0018545 A1    Jan. 17, 2013

(51) Int. Cl.
*G06F 7/00*    (2006.01)

(52) U.S. Cl.
USPC ............. 701/36; 701/117; 701/118; 180/170; 340/907

(58) Field of Classification Search
USPC ............. 701/36, 117, 118; 180/170; 340/906, 340/907
See application file for complete search history.

(56) References Cited

U.S. PATENT DOCUMENTS

| | | | |
|---|---|---|---|
| 4,937,751 A | 6/1990 | Nimura et al. | |
| 5,177,685 A | 1/1993 | Davis et al. | |
| 5,220,507 A | 6/1993 | Kirson | |
| 5,275,474 A | 1/1994 | Chin et al. | |
| 5,291,412 A | 3/1994 | Tamai et al. | |
| 5,351,779 A | 10/1994 | Yamashita | |
| 5,394,332 A | 2/1995 | Kuwahara et al. | |
| 5,406,491 A | 4/1995 | Lima | |
| 5,406,492 A | 4/1995 | Suzuki | |
| 5,578,748 A | 11/1996 | Brehob et al. | |
| 5,742,922 A | 4/1998 | Kim | |
| 5,767,795 A | 6/1998 | Schaphorst | |
| 5,790,973 A | 8/1998 | Blaker et al. | |
| 5,848,364 A | 12/1998 | Ohashi | |
| 5,901,806 A * | 5/1999 | Takahashi | 180/170 |
| 6,005,494 A | 12/1999 | Schramm | |
| 6,028,537 A | 2/2000 | Suman et al. | |
| 6,101,443 A | 8/2000 | Kato et al. | |

(Continued)

FOREIGN PATENT DOCUMENTS

| | | |
|---|---|---|
| DE | 102005029744 | 12/2006 |
| JP | 200964951 | 3/2007 |
| WO | 2008037471 A2 | 4/2008 |

OTHER PUBLICATIONS

Kermit Whitfield, "A hitchhiker's guide to the telematics ecosystem", Automotive Design & Production, Oct. 2003, http://findarticles.com, pp. 1-3.

(Continued)

*Primary Examiner* — Gertrude Arthur Jeanglaude
(74) *Attorney, Agent, or Firm* — Jennifer M. Stec; Brooks Kushman P.C.

(57) ABSTRACT

Traffic density may be estimated by increasing a value of a parameter if an object enters a predefined zone on a side of the vehicle and decreasing the value of the parameter after an object exits the predefined zone such that the value of the parameter increases as traffic in a vicinity of the vehicle increases and decreases as traffic in the vicinity of the vehicle decreases.

19 Claims, 4 Drawing Sheets

(56) References Cited

U.S. PATENT DOCUMENTS

| | | |
|---|---|---|
| 6,314,369 B1 | 11/2001 | Ito et al. |
| 6,374,177 B1 | 4/2002 | Lee et al. |
| 6,424,363 B1 | 7/2002 | Matsuba et al. |
| 6,424,888 B1 | 7/2002 | Sone et al. |
| 6,427,115 B1 | 7/2002 | Sekiyama |
| 6,427,117 B1 | 7/2002 | Ito et al. |
| 6,462,676 B1 | 10/2002 | Koizumi |
| 6,484,092 B2 | 11/2002 | Seibel |
| 6,484,093 B1 | 11/2002 | Ito et al. |
| 6,487,477 B1 | 11/2002 | Woestman et al. |
| 6,532,372 B1 | 3/2003 | Hwang |
| 6,533,367 B1 | 3/2003 | Latarnik et al. |
| 6,574,538 B2 | 6/2003 | Sasaki |
| 6,608,887 B1 | 8/2003 | Reksten et al. |
| 6,691,025 B2 | 2/2004 | Reimer |
| 6,791,471 B2 | 9/2004 | Wehner et al. |
| 6,829,529 B2 | 12/2004 | Trefzer et al. |
| 6,834,229 B2 | 12/2004 | Rafiah et al. |
| 6,866,349 B2 | 3/2005 | Sauter et al. |
| 6,904,362 B2 | 6/2005 | Nakashima et al. |
| 7,053,866 B1 | 5/2006 | Mimran |
| 7,082,443 B1 | 7/2006 | Ashby |
| 7,089,110 B2 | 8/2006 | Pechatnikov et al. |
| 7,113,107 B2 | 9/2006 | Taylor |
| 7,167,799 B1 | 1/2007 | Dolgov et al. |
| 7,243,134 B2 | 7/2007 | Bruner et al. |
| 7,286,931 B2 | 10/2007 | Kawasaki |
| 7,369,938 B2 | 5/2008 | Scholl |
| 7,421,334 B2 | 9/2008 | Dahlgren et al. |
| 7,486,199 B2 | 2/2009 | Tengler et al. |
| 7,571,042 B2 | 8/2009 | Taylor et al. |
| 7,626,490 B2 | 12/2009 | Kashima |
| 7,642,901 B2 | 1/2010 | Kato et al. |
| 7,653,481 B2 | 1/2010 | Tramel |
| 7,706,796 B2 | 4/2010 | Rimoni et al. |
| 7,726,360 B2 | 6/2010 | Sato et al. |
| 7,804,423 B2 | 9/2010 | Mudalige et al. |
| 7,818,380 B2 | 10/2010 | Tamura et al. |
| 7,822,380 B2 | 10/2010 | Wu |
| 7,822,546 B2 | 10/2010 | Lee |
| 7,826,945 B2 | 11/2010 | Zhang et al. |
| 7,894,592 B2 | 2/2011 | Book et al. |
| 7,920,969 B2 | 4/2011 | Mudalige et al. |
| 8,121,802 B2 | 2/2012 | Grider et al. |
| 8,145,376 B2 | 3/2012 | Sherony |
| 8,290,704 B2 | 10/2012 | Bai |
| 2001/0001847 A1 | 5/2001 | Hessing |
| 2002/0087262 A1 | 7/2002 | Bullock et al. |
| 2002/0152018 A1 | 10/2002 | Duckeck |
| 2003/0040866 A1 | 2/2003 | Kawakami |
| 2003/0040868 A1 | 2/2003 | Fish et al. |
| 2003/0158652 A1 | 8/2003 | Friedrichs et al. |
| 2004/0021583 A1 | 2/2004 | Lau et al. |
| 2004/0117108 A1 | 6/2004 | Nemeth |
| 2004/0117113 A1 | 6/2004 | Friedrichs et al. |
| 2005/0085956 A1 | 4/2005 | Losey |
| 2005/0144573 A1 | 6/2005 | Moody et al. |
| 2005/0159881 A1 | 7/2005 | Furukawa |
| 2006/0026335 A1 | 2/2006 | Hodgson et al. |
| 2006/0089788 A1 | 4/2006 | Laverty |
| 2006/0145837 A1 | 7/2006 | Horton et al. |
| 2006/0168627 A1 | 7/2006 | Zeinstra et al. |
| 2006/0172745 A1 | 8/2006 | Knowles |
| 2006/0184314 A1 | 8/2006 | Couckuyt et al. |
| 2006/0190164 A1 | 8/2006 | Glaza |
| 2006/0241857 A1 | 10/2006 | Onishi et al. |
| 2007/0005241 A1 | 1/2007 | Sumizawa et al. |
| 2007/0038362 A1 | 2/2007 | Gueziec |
| 2007/0050248 A1 | 3/2007 | Huang et al. |
| 2007/0093955 A1 | 4/2007 | Hughes |
| 2007/0104224 A1 | 5/2007 | Conner et al. |
| 2007/0143013 A1 | 6/2007 | Breen |
| 2007/0143482 A1 | 6/2007 | Zancho |
| 2007/0143798 A1 | 6/2007 | Jira et al. |
| 2007/0198172 A1 | 8/2007 | Sumizawa et al. |
| 2007/0203643 A1 | 8/2007 | Ramaswamy et al. |
| 2007/0203646 A1 | 8/2007 | Diaz et al. |
| 2007/0213092 A1 | 9/2007 | Geelen |
| 2007/0219706 A1 | 9/2007 | Sheynblat |
| 2007/0273624 A1 | 11/2007 | Geelen |
| 2007/0290839 A1 | 12/2007 | Uyeki et al. |
| 2008/0005734 A1 | 1/2008 | Poristoin et al. |
| 2008/0065318 A1 | 3/2008 | Ho |
| 2008/0082260 A1 | 4/2008 | Kimura |
| 2008/0114534 A1 | 5/2008 | Yamazaki et al. |
| 2008/0147305 A1 | 6/2008 | Kawamata et al. |
| 2008/0147308 A1 | 6/2008 | Howard et al. |
| 2008/0162034 A1 | 7/2008 | Breen |
| 2008/0195305 A1 | 8/2008 | Jendbro et al. |
| 2008/0228346 A1 | 9/2008 | Lucas et al. |
| 2008/0303693 A1 | 12/2008 | Link, II |
| 2009/0055091 A1 | 2/2009 | Hines et al. |
| 2009/0083627 A1 | 3/2009 | Onda et al. |
| 2009/0143934 A1 | 6/2009 | Motonaga et al. |
| 2009/0186596 A1 | 7/2009 | Kaltsukis |
| 2009/0192688 A1 | 7/2009 | Padmanabhan et al. |
| 2009/0196294 A1 | 8/2009 | Black et al. |
| 2009/0228172 A1 | 9/2009 | Markyvech et al. |
| 2009/0254266 A1 | 10/2009 | Altrichter et al. |
| 2009/0259354 A1 | 10/2009 | Krupadanam et al. |
| 2009/0326797 A1 | 12/2009 | Tengler et al. |
| 2009/0326801 A1 | 12/2009 | Johnson et al. |
| 2010/0010732 A1 | 1/2010 | Hartman |
| 2010/0048184 A1 | 2/2010 | Kim |
| 2010/0088018 A1 | 4/2010 | Tsurutome et al. |
| 2010/0088029 A1 | 4/2010 | Hu et al. |
| 2010/0094500 A1 | 4/2010 | Jin |
| 2010/0094550 A1 | 4/2010 | Tsurutome et al. |
| 2010/0174485 A1 | 7/2010 | Taylor et al. |
| 2010/0191463 A1 | 7/2010 | Berry et al. |
| 2010/0198508 A1 | 8/2010 | Tang |
| 2010/0217482 A1 | 8/2010 | Vogel et al. |
| 2010/0241342 A1 | 9/2010 | Scalf et al. |
| 2010/0245123 A1 | 9/2010 | Prasad et al. |
| 2011/0003578 A1 | 1/2011 | Chen et al. |
| 2011/0004523 A1 | 1/2011 | Giuli et al. |
| 2011/0028118 A1 | 2/2011 | Thomas |
| 2011/0046883 A1 | 2/2011 | Ross et al. |
| 2011/0166774 A1 | 7/2011 | Schunder et al. |
| 2011/0178811 A1 | 7/2011 | Sheridan |
| 2011/0221586 A1 | 9/2011 | Eikelenberg et al. |
| 2011/0238289 A1 | 9/2011 | Lehmann et al. |
| 2011/0246016 A1 | 10/2011 | Vang et al. |
| 2011/0255481 A1 | 10/2011 | Sumcad et al. |
| 2012/0004841 A1 | 1/2012 | Schunder |
| 2012/0029806 A1 | 2/2012 | Scalf et al. |
| 2012/0029807 A1 | 2/2012 | Schunder et al. |
| 2012/0041673 A1 | 2/2012 | Vandivier et al. |
| 2012/0053825 A1 | 3/2012 | Schunder |

OTHER PUBLICATIONS

Ford Motor Company, "Navigation System: SYNC," Owner's Guide Supplement, SYNC Version 1 (Jul. 2007).

Ford Motor Company, "SYNC," Owner's Guide Supplement, SYNC Version 1 (Nov. 2007).

Ford Motor Company, "SYNC," Owner's Guide Supplement, SYNC Version 2 (Oct. 2008).

Ford Motor Company, "Navigation System: SYNC," Owner's Guide Supplement, SYNC Version 2 (Oct. 2008).

Ford Motor Company, "Navigation System: SYNC," Owner's Guide Supplement, SYNC Version 3 (Jul. 2009).

Ford Motor Company, "Navigation System: SYNC," Owner's Guide Supplement, SYNC Version 3 (Aug. 2009).

Findlater et al., Impact of Screen Size on Performance, Awareness, and User Satisfaction with Graphical User Interfaces, Association for Computing Machinery (ACM), Apr. 5-10, 2008, pp. 1247-1256, see Fig. 1.

Garmin Garage, Follow the Leader, www.garmin.com/garmin/cms/site/us.

TomTom, portable car navigation systems, http://www.tomtom.com, Feb. 6, 2009.

(56) References Cited

OTHER PUBLICATIONS

MapQuest Maps—Driving Directions—Map, http://www.mapquest.com, Aug. 25, 2009.

Multi-Modal Navigation Tools, TDM Encyclopedia, Jan. 26, 2010.

Google Maps Finally Adds Bike Routes, Mary Catherine O'Connor, Mar. 10, 2010, printed from www.wired.com/autopia/2010/03/google-maps-for-bikes/.

POI Along Route Qs, Printed from http://www.tomtomforums.com, printed Jul. 30, 2010.

Difficult POI search in Streets & Trips, printed from http://www.laptopgpsworld.com/3520-difficult-poi-search-streets-tips, printed Jul. 30, 2010.

http://www.rated4stars.com/html/gps-saves-gas.html.

http://www.gps.cx/index.php?c=1&n=493964&i=B001LTHONU&x=GPS_Buddy_FE01US_Fuel_Economy_Software_Package.

http://www.gpsmagaziine.com/2009/02/hands-on_with_garmins_new_ecor.php (Feb. 2009).

http://www.nrel.gov/vehiclesandfuels/vsa/pdfs/42557.pdf (Apr. 2008).

http://green.autoblog.com/2009/03/05/sentience-research-vehicle-shows-how-tons-of-data-can-save-milli/ (Mar. 2009).

http://reviews.cnet.com/8301-13746_7-10189749-48.html.

Navigator—A Talking GPS Receiver for the Blind, Ryszard Kowalik and Stanislaw Kwasniewski, Gdansk University of Technology, 2004.

Speech-Enabled Web Services for Mobile Devices, M. Hu, Z. Davis, S. Prasad, M. Schuricht, P.M. Melilar-Smith and L.E. Moser, Department of Electrical and Computer Engineering, University of California, Santa Barbara, CA 93106.

International Searching Authority, International Search Report and the Written Opinion for the corresponding PCT Application No. PCT/US2009/69668 mailed Mar. 4, 2010.

International Searching Authority, The International Search Report and the Written Opinion of the International Searching Authority for the corresponding International Application No. PCT/US2010/23887 mailed Apr. 12, 2010.

Patent Cooperation Treaty, International Preliminary Examining Authority, International Preliminary Report on Patentability for the corresponding PCT/US10/23887 mailed Apr. 29, 2011.

\* cited by examiner

TRAFFIC DENSITY ESTIMATION

TECHNICAL FIELD

This disclosure relates to techniques for estimating traffic density in the vicinity of a vehicle.

BACKGROUND

Certain vehicles may provide infotainment information, navigation information, etc. to enhance the driving experience. As the interaction between drivers and these vehicles increases, it may be beneficial to facilitate such interaction without increasing driver workload.

SUMMARY

A vehicle may include at least one controller. The at least one controller may increase at a first rate a value of a parameter representing a traffic density in a vicinity of the vehicle after an object enters a predefined zone on a side of the vehicle and decrease at a second rate less than the first rate the value of the parameter after an object exits the predefined zone such that the value of the parameter increases as traffic in the vicinity of the vehicle increases and decreases as traffic in the vicinity of the vehicle decreases.

A vehicle may include at least one controller that determines a traffic density in a vicinity of the vehicle based on a number of objects that consecutively enter a predefined zone on a side of the vehicle each within a specified time interval after a previous object exits the predefined zone.

A vehicle may include at least one controller that detects an increase in traffic condition if an object enters a predefined zone on a side of the vehicle within a specified time interval after a previous object exits the predefined zone. The at least one controller may increase a value of a parameter representing a traffic density in a vicinity of the vehicle in response to detecting the increase in traffic condition such that the value of the parameter increases as traffic in the vicinity of the vehicle increases.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Assessment of driving-demand/workload may be of value when modulating communication, recommendations, and vehicle systems interactions with the driver. The complex vehicle, driver, and environment driving contexts therefore may require innovative prognostic approaches to driver workload inference. Increased traffic density in the immediate surrounding environment of the vehicle may have the tendency to increase the driving-demand/workload for certain drivers. Information about general route traffic conditions may be available through digital electronics and connected services. Traffic information within the immediate envelope of the vehicle, however, is not provided. Awareness of the traffic density within close proximity of a host vehicle provides opportunities to integrate that information into driver workload assessment applications. Intelligent estimation of the traffic density and associated workload may allow certain vehicle technologies to not only be suppressed, delayed or recommended, but in addition tailored to the driving demand.

This disclosure provides, inter alia, examples of methods and systems for traffic density estimation using side detection sensors for driver workload inference. Sensors used with existing blind spot detection systems, for example, may collect data that can be analyzed to estimate traffic density and hence, driver workload. Other side detection sensors including lidar based or vision systems, however, may be used to identify vehicles as input for traffic density estimation.

Figure 1:
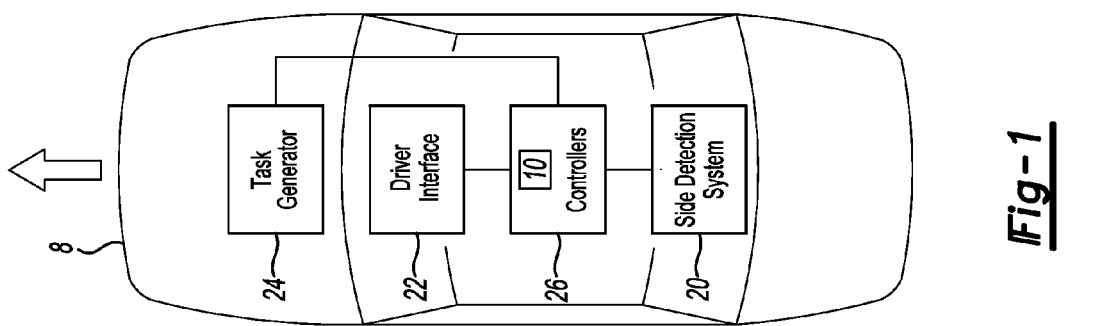
FIG. 1 is a schematic diagram illustrating vehicle blind spot locations, which in this example are areas on either side of the vehicle extending rearward from the outside mirrors to approximately 3 meters behind the bumper.
Figure 2:
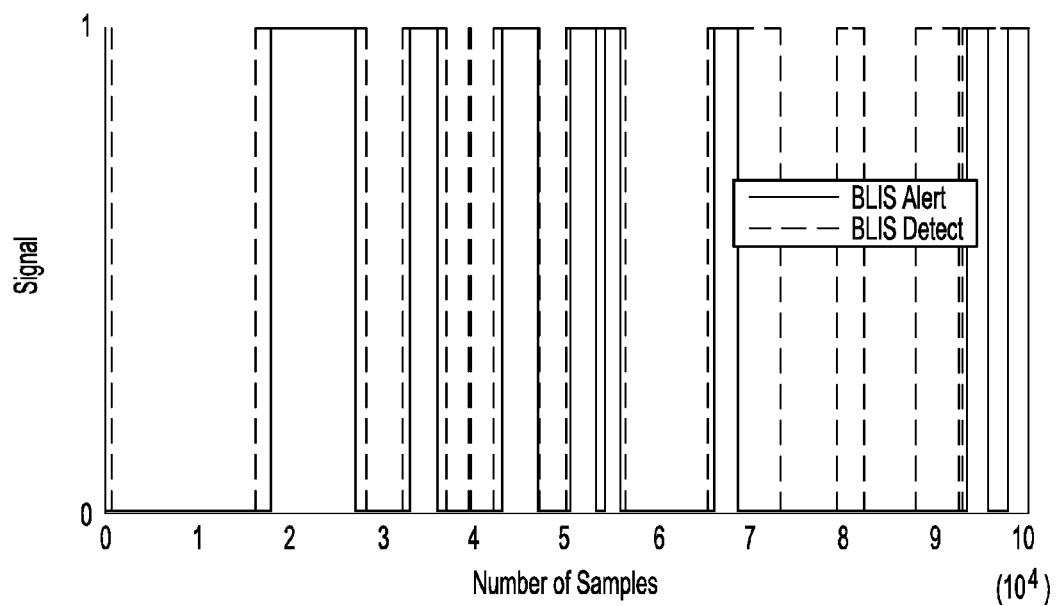
FIG. 2 is a plot of blind spot detection system "Alert" and "Detect" signals indicating, in this example, the presence of objects and validated objects detected within a driver's side blind spot.

Multi-beam radar, for example, may be used to detect vehicles in a host vehicle blind-spot area. FIG. 1 shows example predefined blind-spot zones (textured). These zones cover areas from the side mirror to about 3 meters behind the rear bumper of a host vehicle 8. Certain blind spot detection systems typically provide two types of signals from both the left and right side of the vehicle. A binary signal tagged as "Detect" takes the value of 1 when an object, moving or non-moving, is determined to occupy a portion of the predefined blind spot region. An "Alert" signal takes the value of 1 if a validated moving object, such as a vehicle, is located in the blind spot region with respect to the host vehicle. An object may be validated by known signal processing techniques that include determining that an object is moving relative to the host vehicle based on the rate-of-change of distance to the host vehicle. A consistent detected signal within the field-of-view of the detection zone, in certain implementations, may also be required. Further validation may be achieved by filtering clutter and spurious detections as known in the art. FIG. 2 shows an example plot of the "Detect" (dashed line) and "Alert" (solid line) signals for a traffic scenario.

Based on information obtained continuously from, for example, a blind spot detection system or side detection system, the following assumptions may be made: (1) traffic density around the operating vehicle is highly correlated to the number of vehicles passing the host vehicle; (2) the traffic density can be estimated and quantified by signal processing and real-time computation of input signals indicative of cars entering/exiting the blind spot repetitively during pre-defined time durations; and, (3) the time duration is a tuning variable (a longer observation time sets a longer duration for traffic density estimation and vice-versa).

Certain traffic density estimators (TDEs) may be implemented based on the assumptions indicated above. Two timers and a set of exponential smoothing functions are described below with reference to an example algorithm for estimating traffic density. Other suitable techniques, however, may be used.

Based on the step-function type signal illustrated in FIG. 2, a TDE may create continuous signal profiles. Two timers may then be implemented to control: 1) the rise time of an exponentially increasing signal when the alert step-function is detected; and, 2) the time to hold the last known value, and the exponential decay of the signal.

Consider the process and related equations governing the computation of a real-time TDE_Index continuous signal profile. Let $y_0$ represent the current input alert signal.

$$y_0 = \begin{cases} 1 & \text{if vechicle is (detected \& validated)} \\ 0 & \text{if vehicle is not (detected \& validated)} \end{cases} \quad (1)$$

Further signal integrity checks of the $y_0$ input signal may be assessed to ensure that a binary input is applied and a minimum speed level criterion is met. The subsequent value y is given by $$y = \begin{cases} 1 & \text{if } y_0 > 0 \ \& \ S_h \geq \beta \\ 0 & \text{otherwise} \end{cases} \quad (2)$$

where $S_h$ is the host vehicle speed and $\beta$ is the minimum vehicle speed constant (e.g., 15 mph).

Functions may be employed to ensure that an exponential forgetting factor ff is within bounds for stability and robustness. A scalar to modify ff may be incorporated and given by $$ff_1 = ff_0 \times (1 + \delta \times sc) \quad (3)$$

$$ff = \max(l_l, \min(l_h, ff_1)) \quad (4)$$

where $ff_0$ is the initial forgetting factor, sc is a scalar with a default value of −1, and δ is a small value (e.g., 0.05). A typical value for $l_l$, the low forgetting factor limit, is 0.9. A typical value for $l_h$, the high forgetting factor limit, is 0.9999.

The real-time exponential signal generation functions for the left and right sides of the vehicle are given by $$R\_TDE_{new} = ff \cdot R\_TDE_{old} + (1-ff) \cdot y_r \quad (5)$$

$$L\_TDE_{new} = ff \cdot L\_TDE_{old} + (1-ff) \cdot y_l \quad (6)$$

where $R\_TDE_{new}$ and $L\_TDE_{new}$ are the vehicle right side and vehicle left side traffic density estimates, respectively, $R\_TDE_{Old}$ and $L\_TDE_{old}$ are the previous one sample estimates of $R\_TDE_{new}$ and $L\_TDE_{new}$, respectively, and $y_r$ and $y_l$ are the current right and left alert input signals, respectively. The final traffic density index with a value from 0 to 1 may be given by $$TDE\_\text{Index} = \max(R\_TDE, L\_TDE) \quad (7)$$

Increased traffic density is reflected in the TDE_Index as values close to 1, while low-traffic density is reflected in the TDE_Index as values close to 0. Discussion of the timer controlled exponential increment and timer triggered exponential decay to obtain the final TDE_Index value of (7) is provided below.

Figure 3:
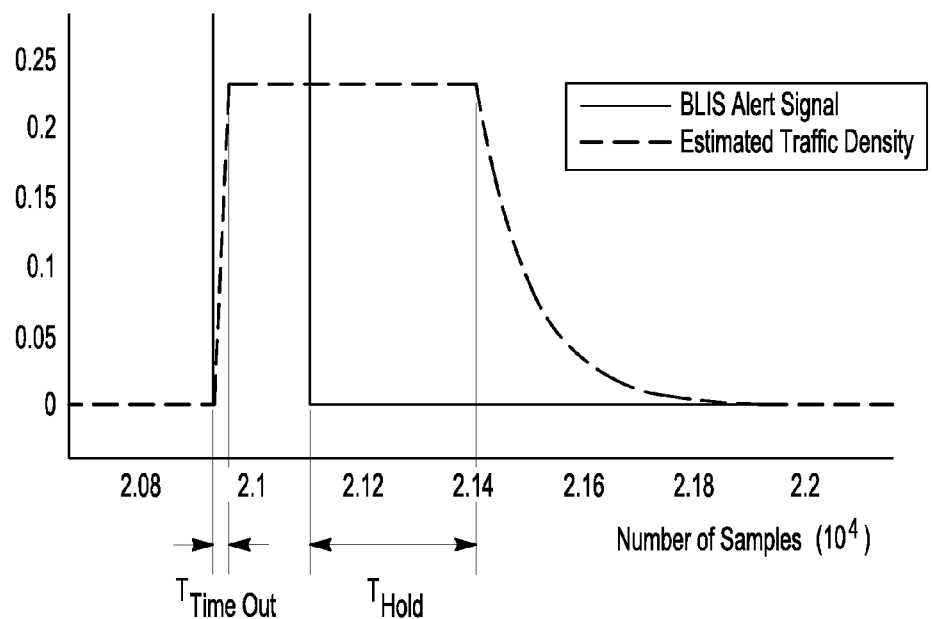
FIG. 3 is a plot of a blind spot detection system "Alert" signal and a corresponding estimated traffic density index with associated $T_{Time\ out}$ and $T_{Hold}$ time periods.

Referring to FIG. 3, when a vehicle enters a blind spot area associated with a particular side, the corresponding "Alert" signal takes on a value of 1, which triggers the start of a 1st timer, T1. The value of the "Alert" signal will remain at 1 as long as the vehicle remains in the blind spot area. An exponential function (e.g., (5) or (6) depending on which blind spot is implicated) receiving this excitation increases the TDE_Index value progressively based on a filter time-constant (e.g., 0.38 sec). The behavior of the TDE_Index may then be governed by the following conditions: 1) If T1 ≤ $T_{Time\ out}$, the TDE_Index increases exponentially for a maximum time of $T_{Time\ out}$; and, 2) At the expiration of $T_{Time\ out}$, even if the vehicle stays in the blind spot area, the TDE_Index value is held constant preventing further increment unless a subsequent vehicle is detected entering the zone.

When a vehicle exits the blind spot area associated with a particular side, the corresponding "Alert" signal takes on a value of 0, which triggers the start of a 2nd timer, T2. T2, in this example, continuously updates with a count limit set at $T_{Hold}$. The value of the "Alert" signal will remain at 0 as long as another vehicle does not enter the blind spot area. The timer, T2, is designed to keep the TDE_Index unchanged for a period up to $T_{Hold}$ such that a subsequent vehicle entering the blind spot area would cause further increase in the TDE_Index (representing increased traffic density). At the expiration of T2, the TDE_Index decays exponentially.

The TDE_Index may not accumulate in value if the timer T2 is not used (e.g., $T_{Hold}$ is set to 0) and the rate of decay is relatively fast. That is in examples in which the TDE_Index is not held constant, the TDE_Index may decay to 0 before another vehicle could ever enter the detection zone. This may preclude the TDE_Index from increasing in value as traffic increases. Nevertheless, $T_{Hold}$ may be set to 0 (or T2 not used at all) if the rate of decay of the TDE_Index is such that the TDE_Index may increase in value as traffic increases (and decrease in value as traffic decreases). For example, the rate of decay may be set so that it takes 4 seconds before the TDE_Index decays to 0. Hence, vehicles that consecutively enter the detection zone within 4 seconds of each other will cause the TDE_Index to accumulate in value. Other scenarios are also contemplated.

Figure 4:
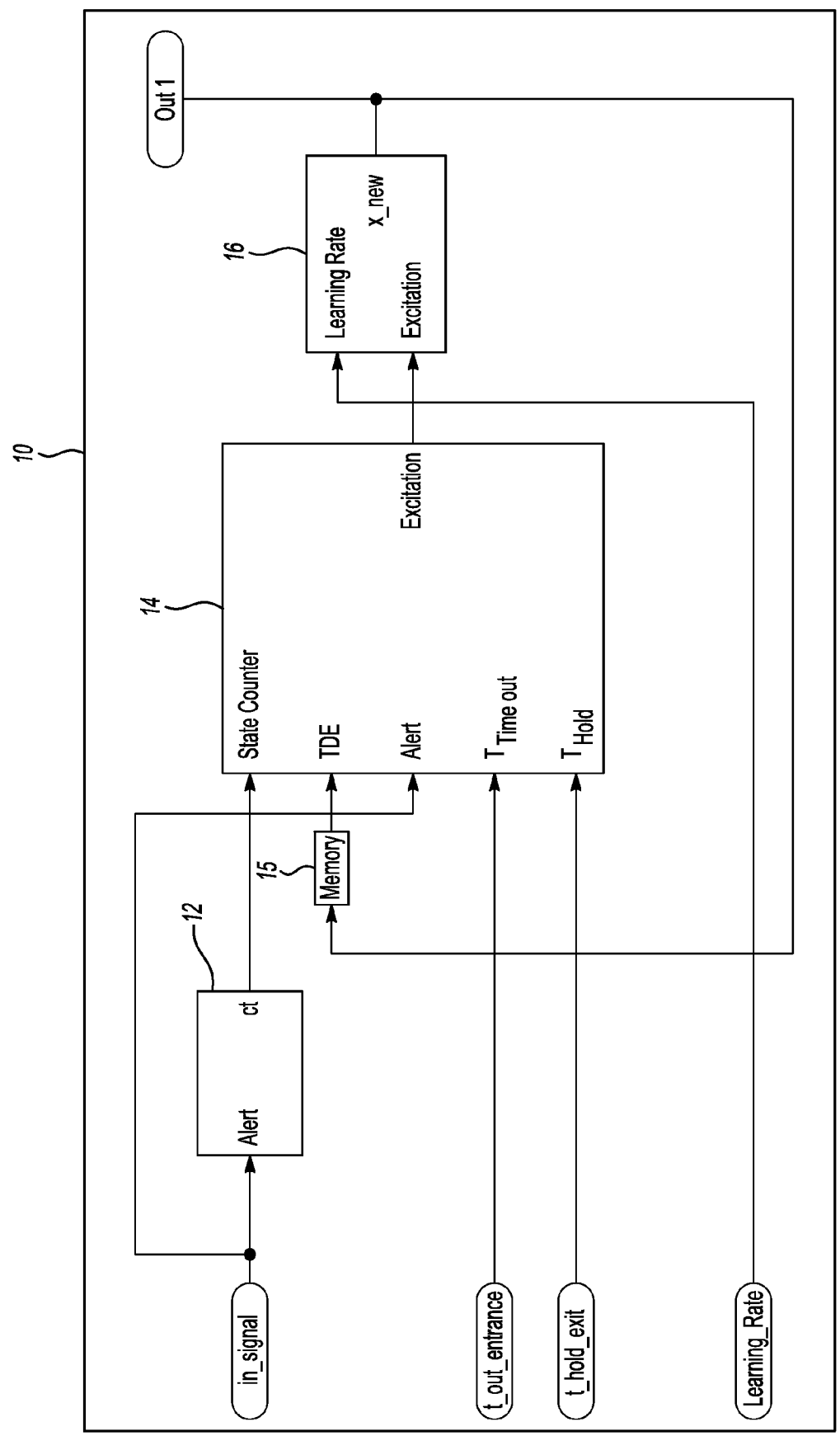
FIG. 4 is a schematic diagram of an embedded implementation of a traffic density estimator.

FIG. 4 illustrates a block diagram of an example TDE system 10. Subsystem 12 receives as input the "Alert" signal (In_signal) discussed above and implements a state counter (ct) which is reset to zero upon a change in the In_signal. Subsystem 14 receives as input the "State Counter" from the subsystem 12, the previous value of the TDE_Index (TDE) from memory 15, the "Alert" signal, and parameters associated with $T_{Time\ out}$ (t_out_entrance) and $T_{Hold}$ (t_hold_exit). The subsystem 14 also incorporates the timers T1 and T2. Subsystem 14 generates an "Excitation" signal according to (1) and (2). The value of this "Excitation" signal is governed by the value of the "State Counter" as compared with $T_{Hold}$ and $T_{Time\ out}$ as described above. Subsystem 16 receives as input the forgetting factor (Learning Rate) and the "Excitation" from the subsystem 14. The current value of the TDE_Index (x_new), which is generated according to (3), (4), (5), (6) and (7), is then output to "Out 1" and to memory 15.

Figure 5:
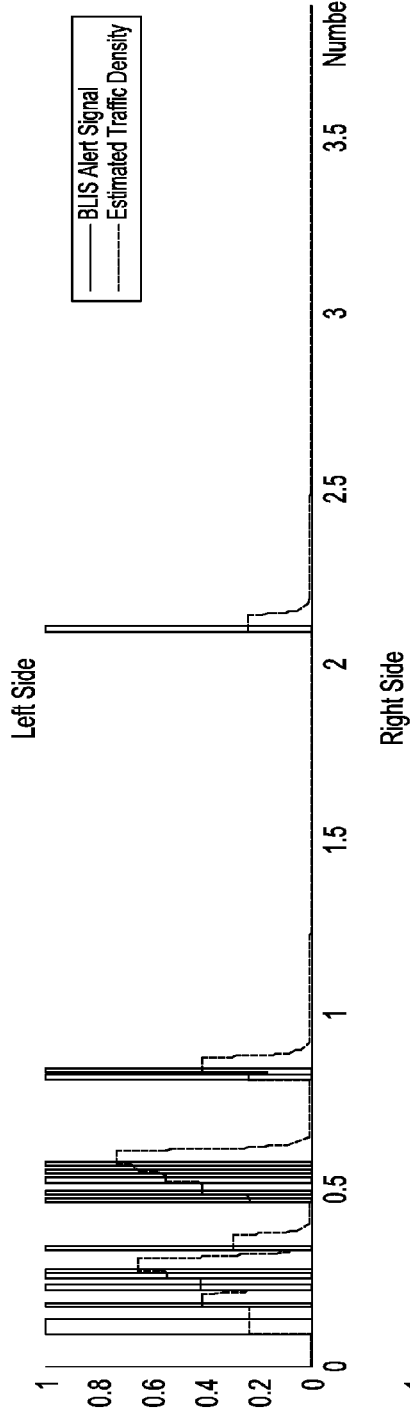
FIGS. 5 and 6 are, respectively, plots of driver's side and passenger's side "Alert" signals and corresponding traffic density indices.
Figure 6:
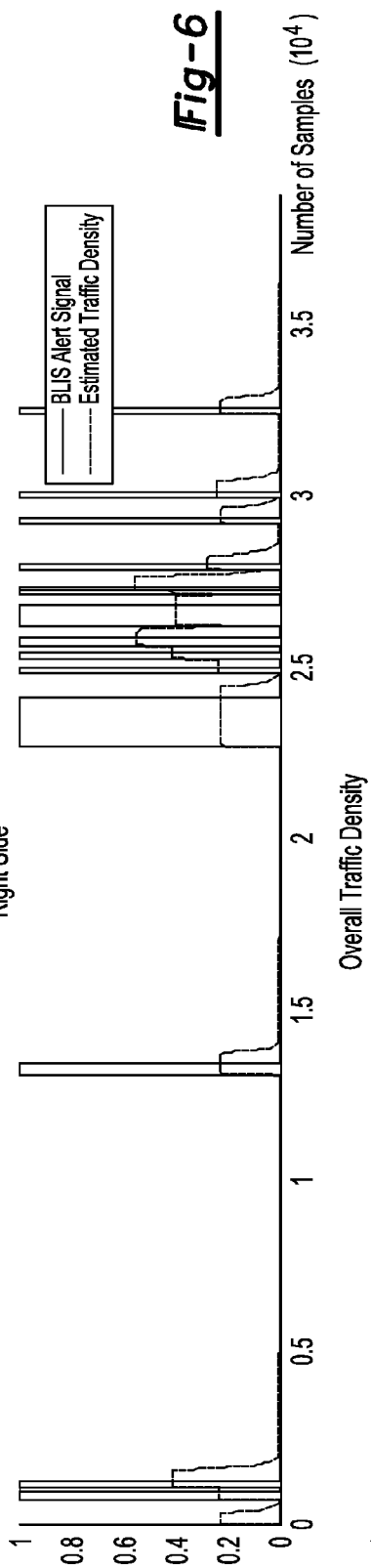
Figure 7:
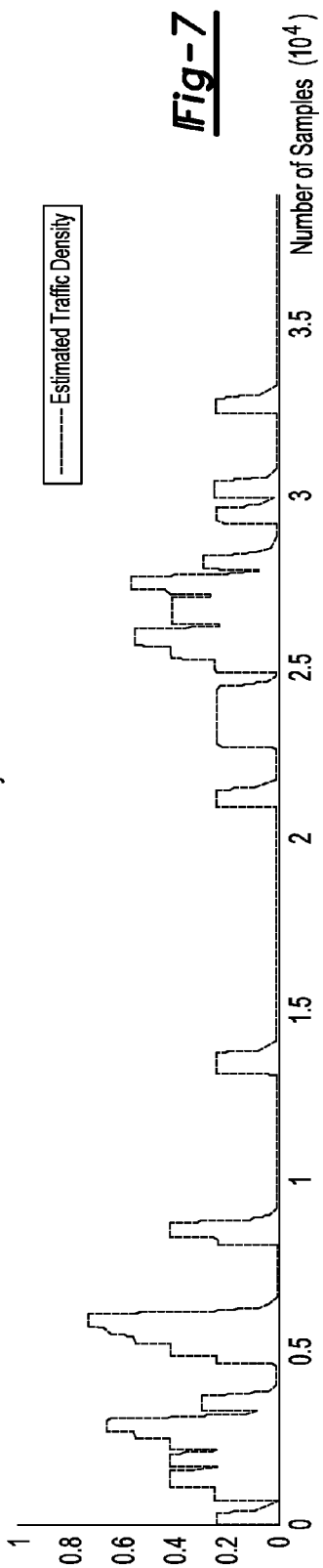
FIG. 7 is a plot of an overall traffic density index based on the indices of FIGS. 5 and 6.

FIGS. 5 and 6 illustrate plots of example blind spot alert signals and corresponding TDE indices. FIG. 5 illustrates the driver side "Alert" signal (solid line) and the generated TDE signal (dashed line). FIG. 6 illustrates the passenger side "Alert" signal (solid line) and the generated TDE signal (dashed line). FIG. 7 illustrates the aggregated (e.g., averaged, weighted averaged, maximum, etc.) TDE signal based on the TDE signals from the passenger and driver sides of the vehicle.

Referring again to FIG. 1, the vehicle 8 includes a side detection system 20 (e.g., blind spot detection system) with an appropriate field-of-view to detect vehicles entering and exiting the sides of the vehicle 8, driver interface 22 (e.g., human machine interface, touch screen, speaker system, etc.), and task generator 24 in communication with/under the control of one or more controllers 26. The side detection system 20, in this example, includes known sensors and processors arranged to detect vehicles within blind spot areas (textured) associated with the vehicle 8 and to generate corresponding "Alert" and "Detect" signals. The controllers 26, which may implement the TDE system 10, may receive the "Alert" and "Detect" signals via, for example, a Controller Area Network and determine a TDE_Index on the basis thereof as described herein.

The controllers 26 may use the TDE_Index to determine whether to delay, prevent, or schedule information, alerts, etc. (generated by the task generator 24) from being displayed and/or played by the driver interface 22. If the task generator 24 is a cell phone for example, an alert corresponding to an incoming call may be prevented from being displayed via the driver interface 22 if the TDE_Index exceeds some predefined value (e.g., 0.5). If the task generator 24 is an intelligent system configured to, inter alia, generate maintenance or refueling reminders, these reminders may be delayed from being displayed via the driver interface 22 until the TDE_Index becomes less than some predefined value. (e.g., 0.4). Other scenarios are also contemplated. For example, the TDE_Index may be aggregated with other indices that represent driver workload, or incorporated as a bias value in an estimation of driver workload, etc.

The algorithms disclosed herein may be deliverable to/implemented by a processing device, such as the controllers 26, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, cell phones, or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   at least one controller configured to increase at a first rate a value of a parameter representing a traffic density in a vicinity of the vehicle after an object enters a predefined zone on a driver's side or passenger's side of the vehicle and to decrease at a second rate less than the first rate the value of the parameter after an object exits the predefined zone such that the value of the parameter increases as traffic in the vicinity of the vehicle increases and decreases as traffic in the vicinity of the vehicle decreases.

2. The vehicle of claim 1 wherein the at least one controller is further configured to first hold constant the value of the parameter for a specified time interval after an object exits the predefined zone before decreasing the value of the parameter.

3. The vehicle of claim 1 wherein the value of the parameter is increased for a predetermined period of time.

4. The vehicle of claim 1 further comprising a driver interface and a task generator configured to generate tasks for display or play by the driver interface, wherein the at least one controller is further configured to prevent or delay the tasks from being displayed or played if the value of the parameter exceeds a predefined threshold.

5. The vehicle of claim 1 further comprising a driver interface and a task generator configured to generate tasks for display or play by the driver interface, wherein the at least one controller is further configured to schedule the tasks for display or play based on the value of the parameter.

6. A vehicle comprising:
   at least one controller configured to determine a traffic density in a vicinity of the vehicle based on a number of objects that consecutively enter a predefined zone on one of a driver's side or passenger's side of the vehicle each within a specified time interval after a previous object exits the predefined zone.

7. The vehicle of claim 6 wherein determining a traffic density in a vicinity of the vehicle based on a number of objects that consecutively enter a predefined zone on one of a driver's side or passenger's side of the vehicle each within a specified time interval after a previous object exits the predefined zone includes increasing at a first rate a value of a parameter representing the traffic density in the vicinity of the vehicle if an object enters the predefined zone within the specified time interval after a previous object exits the predefined zone.

8. The vehicle of claim 7 wherein the value of the parameter is increased for a predetermined period of time.

9. The vehicle of claim 7 wherein determining a traffic density in a vicinity of the vehicle based on a number of objects that consecutively enter a predefined zone on one of a driver's side or passenger's side of the vehicle each within a specified time interval after a previous object exits the predefined zone includes decreasing at a second rate less than the first rate the value of the parameter if an object exits the predefined zone.

10. The vehicle of claim 9 wherein the at least one controller is further configured to first hold constant the value of the parameter for a specified time interval if an object exits the predefined zone before decreasing the value of the parameter.

11. The vehicle of claim 9 wherein the value of the parameter is increased and decreased such that the value of the parameter increases as traffic in the vicinity of the vehicle increases and decreases as traffic in the vicinity of the vehicle decreases.

12. The vehicle of claim 6 wherein the at least one controller is further configured to determine the traffic density in the vicinity of the vehicle further based on a number of objects that consecutively enter another predefined zone on the other of the driver's side or passenger's side of the vehicle each within a specified time interval after a previous object exits the another predefined zone.

13. The vehicle of claim 12 wherein determining the traffic density in the vicinity of the vehicle further based on a number of objects that consecutively enter the another predefined zone within a specified time interval after a previous object exits the another predefined zone includes increasing a value of another parameter representing the traffic density in the vicinity of the vehicle if an object enters the another predefined zone and decreasing the value of the another parameter if an object exits the another predefined zone such that the value of the another parameter increases as traffic in the vicinity of the vehicle increases and decreases as traffic in the vicinity of the vehicle decreases.

14. The vehicle of claim 13 wherein the at least one controller is further configured to average the values of the parameter and the another parameter.

15. The vehicle of claim 13 wherein the at least one controller is further configured to select a maximum value among the parameter and the another parameter.

16. A vehicle comprising:
   at least one controller configured to detect an increase in traffic condition if an object enters a predefined zone on a driver's side or passenger's side of the vehicle within a specified time interval after a previous object exits the predefined zone and to increase a value of a parameter representing a traffic density in a vicinity of the vehicle in response to detecting the increase in traffic condition such that the value of the parameter increases as traffic in the vicinity of the vehicle increases.

17. The vehicle of claim 16 wherein the value of the parameter is increased exponentially for a predetermined period of time.

18. The vehicle of claim 16 wherein the at least one controller is further configured to hold constant the value of the parameter during the specified time interval unless another object enters the predefined zone during the specified time interval.

19. The vehicle of claim 18 wherein the at least one controller is further configured to decrease the value of the parameter at the expiration of the specified time interval if the value of the parameter is greater than zero and if an object does not enter the predefined zone within the specified time interval.

* * * * *